(No Model.)

A. ROBINSON.
DENTAL PLATE.

No. 368,492.  Patented Aug. 16, 1887.

Witnesses
Arthur C. Denison.
Edward B. Escott

Inventor
Albert Robinson
By his Attorney
Edward Taggart

UNITED STATES PATENT OFFICE.

ALBERT ROBINSON, OF GRAND RAPIDS, MICHIGAN.

DENTAL PLATE.

SPECIFICATION forming part of Letters Patent No. 368,492, dated August 16, 1887.

Application filed June 15, 1886. Serial No. 205,221. (No model.)

*To all whom it may concern:*

Be it known that I, ALBERT ROBINSON, a citizen of the United States, residing at the city of Grand Rapids, in the county of Kent and State of Michigan, have invented certain new and useful Improvements in Dental Plates, of which the following is a specification.

My invention relates to a dental plate composed in part of hard vulcanized rubber or other similar material, in connection with a soft or flexible rubber or other material, said soft or flexible material being protected from contact with the mouth by a coating of gold or other metal, as more fully described hereinbelow; and the object of my invention is to produce a dental plate having that portion of the plate which comes in contact with the mouth composed of a soft or flexible material protected against corrosion by means of a metallic lining of gold or other material, which will cause the plate to adhere by the pressure of the atmosphere or suction to the roof of the mouth in a firm and substantial manner and yet protect it from the injurious effects of the acids of the mouth, which object I attain by means of the mechanism and construction illustrated in the accompanying drawings, in which—

Figure 1:
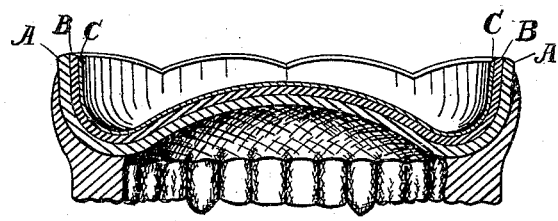
Figure 2:
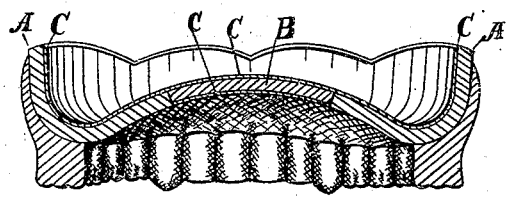
Figure 3:
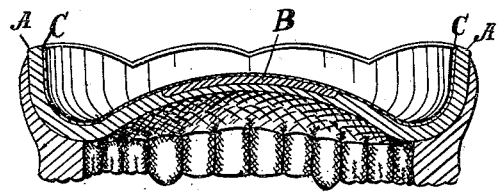

Figure 1 is a transverse sectional view of a dental plate to which is applied the flexible rubber or material entirely overlying the hard vulcanized rubber plate. Fig. 2 is a sectional view of a dental plate in which the flexible rubber or material fills the central portion of the dental plate; and Fig. 3 is a like sectional view in which the flexible rubber or material overlies this central portion of the dental plate, but does not extend entirely through it, as it does in the plate shown in Fig. 2.

Similar letters refer to similar parts throughout the several views.

In Fig. 1, A represents the hard vulcanized rubber or other material suitable for the construction of dental plates. B represents the flexible rubber or other equivalent material overlying the hard vulcanized plate; C, in the same figure, represents a thin yielding metallic covering or lining which covers and yields with the soft or flexible material B.

In dental plates used upon the lower jaw the construction described and shown in Fig. 1 is, in my opinion, preferable to any other form.

In Fig. 2, A represents the hard vulcanized rubber or other material, and B represents the soft or flexible material, which is placed near the center of the dental plate, and is surrounded in whole or in part by the hard vulcanized substance, excepting upon its upper and lower surfaces, which are protected by the metallic covering shown by C.

In dental plates constructed after the manner shown in Fig. 2 the soft or flexible rubber should be lined on both sides by metal, for the reason that soft or flexible rubber is much more readily destroyed by corrosion, and should therefore be protected not only on the side where it comes in contact with the roof of the mouth, but also on the opposite side; otherwise the material will become injured and would soon lose its elasticity.

In Fig. 3, C represents the metal lining. A represents the hard vulcanized rubber or other material. B represents the soft flexible rubber or other material, but which covers only the central portions of the dental plate, instead of extending over the entire surface which comes in contact with the mouth, as is shown and described in Fig. 1. This form is peculiarly adapted, as well as the form shown in Fig. 2, to the upper dental plate, and it takes the place of the cavity or depression which is used in ordinary dental plates.

In the dental plate constructed in accordance with the device shown in Fig. 2 the metallic lining should preferably cover the entire upper surface of the plate, and in any event it must cover the upper surface of the soft or flexible portion of the plate; otherwise the soft rubber would soon become corroded and useless.

I construct my improved dental plate in the following manner: I first take an impression of the mouth in the ordinary way. I then proceed to obtain a cast from such impression. On the cast so obtained I form a wax plate or a plate of any suitable material and set up the teeth on this plate. After fastening the plate with the teeth attached to the cast I place the cast in the lower half of the flask, and then put in the upper half of the flask and fill with plaster-of-paris in the ordinary manner. After the plaster shall have become hardened I separate the flask. I then remove the wax and in its place pack the rubber, which vulcanizes hard—the rubber ordinarily used or other suitable material. I then place a piece of cloth or other suitable material over the rubber, close the flask, and press down tightly. This gives form to the inclosed plate. I now open the flask and place on the rubber plate a sheet of rubber, which remains flexible after vulcanizing. I then place a piece or pieces of suitable metal, so as to cover the flexible portions of the plate, and press the flask together in the usual manner for making dental plates. This leaves the body of the plate of hard vulcanized rubber and that part of the plate which comes in contact with the roof of the mouth on the upper plate elastic vulcanized rubber.

From the description above given a person familiar with the art of making dental plates will readily understand how my invention may be applied to the form shown in the drawings. The soft-rubber portion can be made separately and lined with the metallic lining, and in that shape can be put upon the market as a separate article of manufacture, and which can be readily applied to a dental plate by the dentists who may use the same, as it will be readily understood that this flexible portion of the plate can readily be applied to his dental plate when constructing the same.

I am aware that it has long been common to line dental plates with soft rubber, and common since 1860 to line vulcanite with thin metal and metal foil where there is contact with the mouth.

What I claim is—

1. A dental plate composed in part of hard vulcanized rubber or other similar substance, in combination with a soft or flexible rubber or equivalent substance covering in whole or in part one side of the vulcanized portion, and a metal lining covering said soft or flexible portion, substantially as described.

2. In a dental plate, the combination of the hard vulcanized supporting-body A, a soft and flexible central portion, B, and a thin metal covering, C, covering said central portion and yielding therewith, substantially as described.

ALBERT ROBINSON.

Witnesses:
ARTHUR C. DENISON,
EDWARD B. ESCOTT.